(12) United States Patent
Naruse et al.

(10) Patent No.: US 11,240,441 B2
(45) Date of Patent: Feb. 1, 2022

(54) METHOD, DEVICE, SYSTEM AND COMPUTER-PROGRAM PRODUCT FOR SETTING LIGHTING CONDITION AND STORAGE MEDIUM

(71) Applicant: OMRON Corporation, Kyoto (JP)

(72) Inventors: Yosuke Naruse, Kyoto (JP); Masashi Kurita, Kizugawa (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/970,378

(22) PCT Filed: Mar. 5, 2018

(86) PCT No.: PCT/IB2018/051393
§ 371 (c)(1),
(2) Date: Aug. 16, 2020

(87) PCT Pub. No.: WO2019/171121
PCT Pub. Date: Sep. 12, 2019

(65) Prior Publication Data
US 2020/0412932 A1    Dec. 31, 2020

(51) Int. Cl.
*H04N 5/235*    (2006.01)
*G06N 20/00*    (2019.01)
(Continued)

(52) U.S. Cl.
CPC .......... *H04N 5/2354* (2013.01); *G05B 15/02* (2013.01); *G06N 20/00* (2019.01); *G06T 7/0004* (2013.01);
(Continued)

(58) Field of Classification Search
None
See application file for complete search history.

(56) References Cited

U.S. PATENT DOCUMENTS 9,535,013 B2 *   1/2017   Matsumoto ............ G01N 21/21
10,019,654 B1 *   7/2018   Pisoni ..................... G06N 3/084
(Continued)

FOREIGN PATENT DOCUMENTS

EP      2887055       6/2015
JP      2012101320    5/2012
(Continued)

OTHER PUBLICATIONS

"International Search Report (Form PCT/ISA/210) of PCT/IB2018/051393", dated Sep. 19, 2018, pp. 1-3.
(Continued)

*Primary Examiner* — Stefan Gadomski
(74) *Attorney, Agent, or Firm* — JCIPRNET

(57) ABSTRACT

The present disclosure provides a method, device, system and computer-program product for setting a lighting condition when an object is checked and a storage medium. The method includes that: the object is lighted by light sources capable of changing lighting parameters specifying the lighting condition when the object is captured, and the object with corresponding label data is captured by an image sensor under multiple such lighting parameters to obtain multiple captured images; estimation images of the object are generated on the basis of image data sets obtained by associating the captured images and the corresponding lighting parameters; and the estimation images and the corresponding label data are applied to learning of the machine learning model, and the lighting condition is set on the basis of a comparison result between an estimation result of a machine learning model and the label data. Therefore, operations are simplified.

20 Claims, 12 Drawing Sheets

(51) Int. Cl.
*G05B 15/02* (2006.01)
*G06T 7/00* (2017.01)
*H04N 5/225* (2006.01)
*H04N 7/18* (2006.01)

(52) U.S. Cl.
CPC ............ *H04N 5/2256* (2013.01); *H04N 7/18* (2013.01); *G06T 2207/10152* (2013.01); *G06T 2207/20081* (2013.01); *G06T 2207/30164* (2013.01)

(56) References Cited

U.S. PATENT DOCUMENTS

| | | | |
|---|---|---|---|
| 10,354,139 B1* | 7/2019 | Li | G06N 3/0454 |
| 10,529,137 B1* | 1/2020 | Black | G06N 3/08 |
| 10,579,869 B1* | 3/2020 | Xiong | G06N 3/088 |
| 10,878,283 B2* | 12/2020 | Kurita | G06K 9/6263 |
| 10,885,626 B2* | 1/2021 | Tamai | G06K 9/46 |
| 10,891,520 B2* | 1/2021 | Namiki | G06K 9/2018 |
| 2001/0048522 A1 | 12/2001 | Yonezawa | |
| 2003/0002730 A1* | 1/2003 | Petrich | G06T 7/40 382/154 |
| 2006/0133663 A1* | 6/2006 | Delaney | G06T 7/0004 382/152 |
| 2011/0182496 A1* | 7/2011 | Sakai | G06T 7/001 382/145 |
| 2011/0285822 A1* | 11/2011 | Dai | G06T 7/586 348/46 |
| 2015/0309695 A1* | 10/2015 | Sannandeji | G06F 8/34 715/763 |
| 2016/0148099 A1* | 5/2016 | Micali | G06N 5/04 706/11 |
| 2017/0069075 A1 | 3/2017 | Okuda | |
| 2017/0169620 A1* | 6/2017 | Bleiweiss | G06K 9/00201 |
| 2017/0220887 A1* | 8/2017 | Fathi | G06K 9/00208 |
| 2017/0236013 A1* | 8/2017 | Clayton | G06K 9/00221 382/104 |
| 2017/0278308 A1* | 9/2017 | Bleiweiss | G06K 9/00664 |
| 2017/0364733 A1* | 12/2017 | Estrada | G06N 3/0454 |
| 2018/0032844 A1* | 2/2018 | Yao | G06K 9/66 |
| 2018/0096232 A1* | 4/2018 | Danielsson | G06K 9/6212 |
| 2018/0114334 A1* | 4/2018 | Desai | G06K 9/4604 |
| 2019/0130218 A1* | 5/2019 | Albright | G06K 9/627 |
| 2019/0130292 A1* | 5/2019 | N | G06T 7/75 |
| 2020/0057831 A1* | 2/2020 | Wu | G06T 17/00 |

FOREIGN PATENT DOCUMENTS

| | | |
|---|---|---|
| JP | 2014199584 | 10/2014 |
| JP | 2016006627 | 1/2016 |
| JP | 2016062225 | 4/2016 |
| JP | 2017049974 | 3/2017 |
| WO | 2015188275 | 12/2015 |

OTHER PUBLICATIONS

"Written Opinion of the International Searching Authority (Form PCT/ISA/237) of PCT/IB2018/051393", dated Sep. 19, 2018, pp. 1-6.

"Office Action of Japan Counterpart Application", dated Nov. 9, 2021, with English translation thereof, p. 1-p. 6.

Kunihiro Nakagawa et al., "Extended Virtual Subspace Method for Face Recognition Independent of Pose and Illumination," The Institute of Electronics, Information and Communication Engineers (IEICE), vol. 100, Mar. 2001, pp. 1-12.

Kenji Matsuo et al., "Subpsace Face Recognition for Reducing Lighting Fluctuations," The Institute of Electronics, Information and Communication Engineers (IEICE), vol. 104, Jun. 2004, pp. 1-9.

Stephen J. Schmugge et al., "Crack Segmentation by Leveraging Multiple Frames of Varying Illumination," 2017 IEEE Winter Conference on Applications of Computer Vision (WACV), Mar. 2017, pp. 1-10.

H. Katayama et al., "A study of simulated inspection image generation for evaluation of image inspection system," the 23rd time Symposium on Sensing via Image Information SSII2017, Japan, an image sensing-technology study group, Jun. 2017, pp. 1-8.

\* cited by examiner (a) lighting simulator learning phase (b) lighting and checking algorithm learning phase (c) checking phase

METHOD, DEVICE, SYSTEM AND COMPUTER-PROGRAM PRODUCT FOR SETTING LIGHTING CONDITION AND STORAGE MEDIUM

CROSS-REFERENCE TO RELATED APPLICATION

This application is a 371 application of the International PCT application serial no. PCT/IB2018/051393, filed on Mar. 5, 2018. The entirety of the above-mentioned patent application is hereby incorporated by reference herein and made a part of this specification.

TECHNICAL FIELD

The present disclosure relates to a method, device, system and computer-program product for setting a lighting condition during industrial detection and a storage medium.

BACKGROUND

Product appearance checking in a production field is one of fields where replacement of humans with machines is implemented least, and is an important technical problem, which must be solved, about automation for reduction of labor force in the future. In recent years, along with development of an artificial intelligence and machine learning technology represented by deep learning, a check automation technology is improved by leap and bounds. However, in appearance checking, machine vision and the like, the most troublesome flow during establishment of a check system is design of an imaging system including optimal design of lighting. There exists the following problem: when an operator manually performs optimal design of lighting, for dealing with individual differences of workpieces, it is necessary to change the workpieces determined as objects and alternately and repeatedly perform manual-regulation-based optimization of lighting and regulation of a check algorithm at the same time to achieve expected detection performance, which is very time-consuming. Moreover, there also exists the following problem: when lighting is regulated to be easily observed by the operator, optimal checking accuracy may not always be achieved.

In a conventional art for solving the problems, there is reported a method for calculating an evaluation reference according to a captured image and repeatedly calculating imaging and lighting parameters maximizing/minimizing it (Patent literature 1). However, according to the method, optimization of an evaluation value calculated according to a captured image of a single workpiece which is currently captured may be implemented only, and optimization of a recognizer based on machine learning, for example, learning of differences between multiple workpieces, may not be implemented.

Moreover, there also exists the following problem: there may exist a large number of combined imaging and lighting parameters, and changing an imaging and lighting condition, performing imaging and performing optimization at the same time may require relatively long time to be costed.

In addition, the abovementioned problems exist not only during product appearance checking in a production field, but also in other judgment devices (such as a facial recognition system) that may use the captured images of lit objects as inputs to make various judgments by means of machine learning.

Existing Technical Documents

Patent Document

Patent document 1: EP2887055A1

SUMMARY

The Technical Problem to be Solved

The present disclosure is adopted to solve at least part or all of the foregoing problems.

Means of Solving the Technical Problem

The present disclosure discloses a method for optimizing parameters of a check algorithm under the condition that the parameters of the machine-learning-based check algorithm include design parameters of lighting. Therefore, a user may directly perform optimization of lighting and optimization of the check algorithm at the same time in a manner of maximizing a Loss value (correct ratio under a judgment condition) of the check algorithm.

(1) According to an aspect of the present disclosure, a method for setting a lighting condition when an object is checked is disclosed, wherein a check module including a machine learning model is used to check the object, the machine learning model being generated by using learning data comprising images, and the method is characterized by including that: the object is lighted by light sources capable of changing lighting parameters, the lighting parameters specifying the lighting condition when the object is captured, and the object is captured by an image sensor under multiple such lighting parameters to obtain multiple captured images corresponding to the multiple lighting parameters, wherein the object has known label data; estimation images of the object during lighting with variable lighting parameters are generated on the basis of image data sets obtained by associating the captured images and the lighting parameters corresponding to the captured images; and the estimation images corresponding to the variable lighting parameters and the corresponding label data of the object are applied to learning of the machine learning model, and both the lighting condition and the check algorithm parameters of the machine learning model is set by simultaneously optimizing both the lighting parameters and the check algorithm parameters, on the basis of a comparison result between an estimation result of the machine learning model and the label data of the object.

Therefore, the lighting condition adopted when the check module is used to check the object is set on the basis of the comparison result between the estimation result of the machine learning model and the label data of the object, optimization of the lighting parameters and check algorithm parameters of the machine learning model may be performed at the same time, and operations are simplified.

(2) In the foregoing method, the operation that the estimation images of the object during lighting with the variable lighting parameters includes that: multiple corresponding such image data sets are prepared for multiple types of objects; and multiple such estimation images respectively corresponding to the multiple types of objects during lighting with the variable lighting parameters are generated on the basis of the multiple image data sets.

Therefore, the method may set an optimal lighting condition for different types of objects, and improves universality of a detection model.

(3) According to another aspect of the present disclosure, a method for setting a lighting condition when an object is checked is disclosed, wherein a check module including a machine learning model is used to check the object, the machine learning model being generated by using learning data comprising images, and the method is characterized by including that: the object is lighted by light sources capable of changing lighting parameters, the lighting parameters specifying the lighting condition when the object is captured, and the object is captured by an image sensor under multiple such lighting parameters to obtain multiple captured images corresponding to the multiple lighting parameters, wherein the object has corresponding label data; estimation images of the object during lighting with variable lighting parameters are generated on the basis of image data sets obtained by associating the captured images and the lighting parameters corresponding to the captured images; and the estimation images corresponding to the variable lighting parameters are applied to the machine learning model which has already performed learning, and the lighting condition adopted when the check module is used to check the object is set according to the optimization result with respect only to the lighting parameters on the basis of a comparison result between an estimation result of the machine learning model and the label data of the object.

In the foregoing method, in a manner of determining check algorithm parameters at first and then determining the check lighting parameters by the estimation images, a system calculation amount during learning of the machine learning model may be reduced, a system load may be reduced, and a setting operation over the lighting parameters may be simplified.

(4) In the foregoing method, the operation that the estimation images corresponding to the variable lighting parameters are applied to the machine learning model which has performed learning includes that: learning data including the estimation images and the corresponding label data of the object is applied to additional learning of the machine learning model to update a part of or all of check algorithm parameters of the machine learning model, wherein the label data represents checked features of the object; and both the lighting parameters and a part of or all of the check algorithm parameters of the machine learning model are optimized to make the estimation result of the machine learning model consistent with the label data.

In such a manner, a part of or all of the check algorithm parameters and the check lighting parameters may be simultaneously optimized in the second step of the method, so that the machine learning model may obtain a better learning result.

(5) In the foregoing method, when the lighting condition is set, a number of the estimation images applied to the machine learning model in order to determine the lighting parameters is smaller than a number of the captured images applied to learning of the machine learning model.

Therefore, learning time may be shortened.

(6) In the foregoing method, the lighting parameters include luminous positions and luminous intensity of the light sources.

Therefore, the luminous positions and luminous intensity of the light sources may both be changed to change the lighting parameters.

(7) In the foregoing method, the operation that the lighting condition adopted when the check module is used to check the object is set includes that: a loss function representing the comparison result is minimized and the lighting parameters that minimize the loss function are selected, wherein the lighting parameters are variables of the loss function, wherein the selection that: selecting the lighting parameters that minimize the loss average of the loss function for the lighting parameters of a predetermined range.

Here, the lighting parameters of the predetermined range are considered, so that robustness to an environmental change when the object is checked may be improved.

(8) In the foregoing method, the operation that the estimation images of the object during lighting with the variable lighting parameters are generated includes that: generating the estimation images of the object when the object is lighted in the variable lighting parameters on the basis of weighted linear superposition sum of the captured images corresponding to the lighting parameters that are included in the image data sets, wherein, whose weights are determined according to both the variable lighting parameters and the lighting parameters of the captured images.

Therefore, estimation images of the object under a linear lighting condition may be simulated.

(9) In the foregoing method, the operation that the estimation images of the object during lighting with the variable lighting parameters are generated includes that: generating the estimation images of the object when the object is lighted in the variable lighting parameters on the basis of the image data set and using a nonlinear estimation function with respect to the variable lighting parameters.

Therefore, estimation images of the object under a nonlinear lighting condition may be simulated, and universality of the check module is improved.

(10) According to another aspect of the present disclosure, various devices corresponding to each foregoing method and for setting a lighting condition when an object is checked are further disclosed, which may achieve the same effect as each foregoing method.

(11) According to another aspect of the present disclosure, a system for setting a lighting condition when an object is checked is further disclosed, which may include a processing unit and may be configured to execute any foregoing method.

(12) According to another aspect of the present disclosure, a computer-program product is further disclosed, which is executed to execute any foregoing method.

(13) According to another aspect of the present disclosure, a storage medium is further disclosed, in which a program is stored, the program being executed to execute any foregoing method.

The system, the computer-program product and the storage medium may also achieve the same effect as each foregoing method.

Technical Effect

Two effects of the present disclosure are listed substantially. At first, design hours may be shortened, a systematic design may be obtained, and individualized skilling represented by dependence of performance on skills of staff is prevented. Second, from the point of performance, direct optimization of the whole capturing system and image processing system may be implemented only from the angle of checking accuracy (accepted/rejected product judgment or measured value), for example, a good lighting design for check algorithms and the check algorithm most suitable for such lighting.

BRIEF DESCRIPTION OF THE DRAWINGS

The drawings described herein are used to provide a further understanding of the present disclosure and constitute a part of the present application. The schematic embodiments of the present disclosure and the descriptions thereof are used to explain the present disclosure, and do not constitute improper limitations to the present disclosure. In the drawings.

Figure 4:
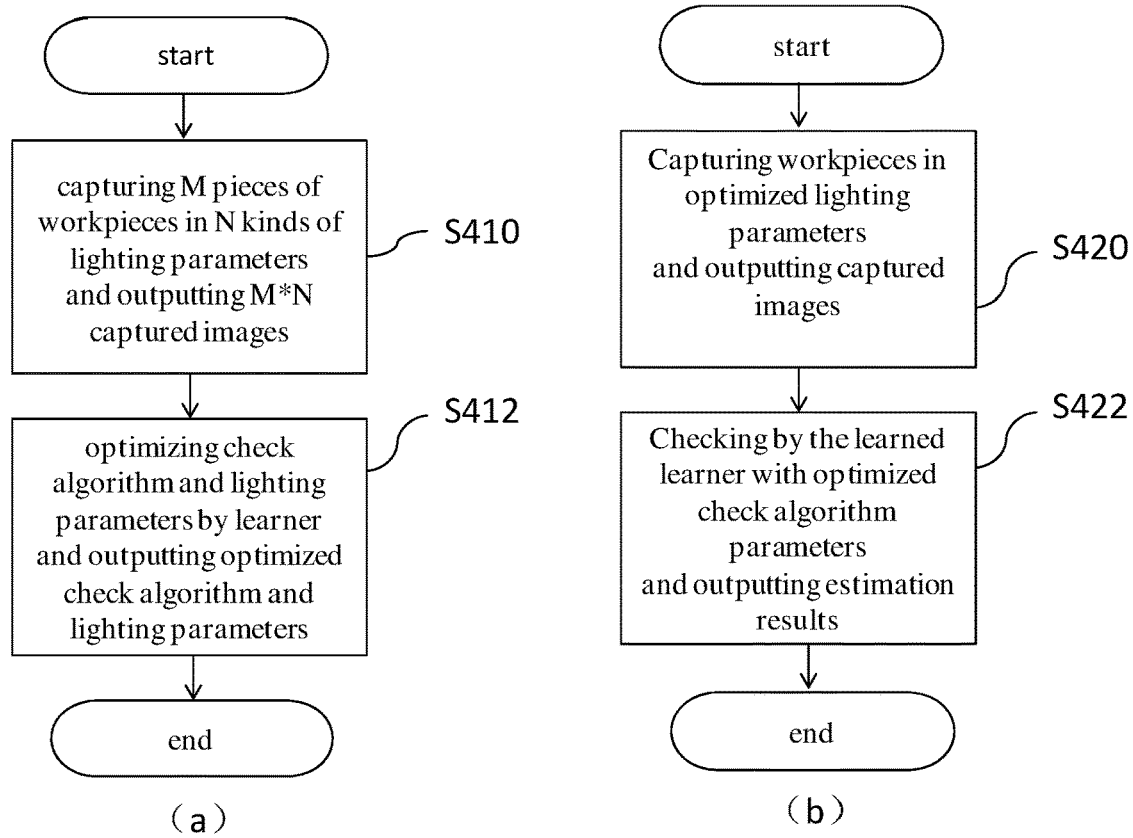
Figure 5:
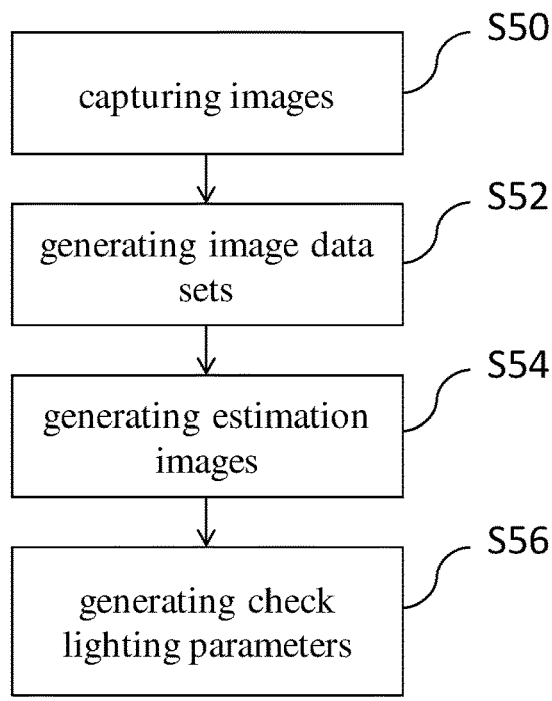
Figure 6A:
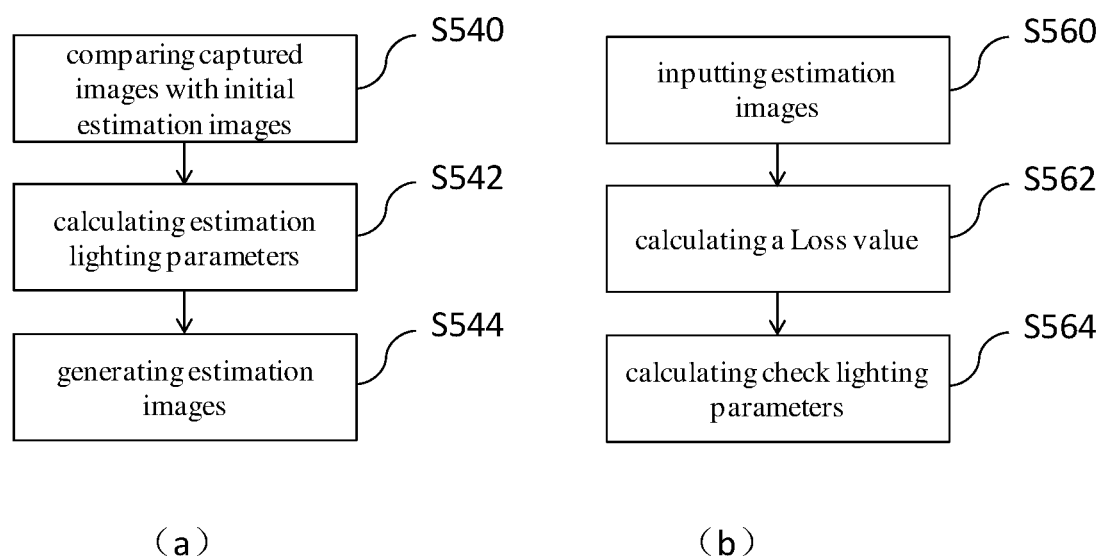
Figure 6B:
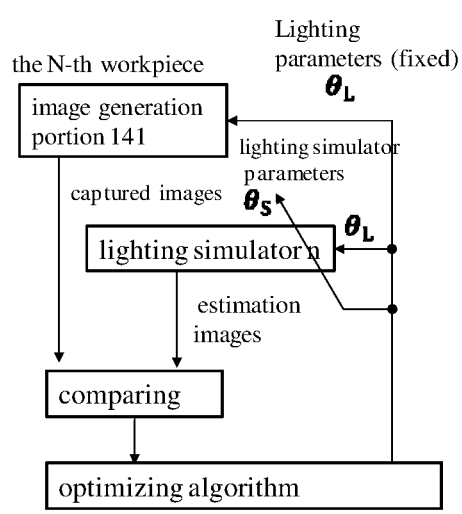
Figure 6B:
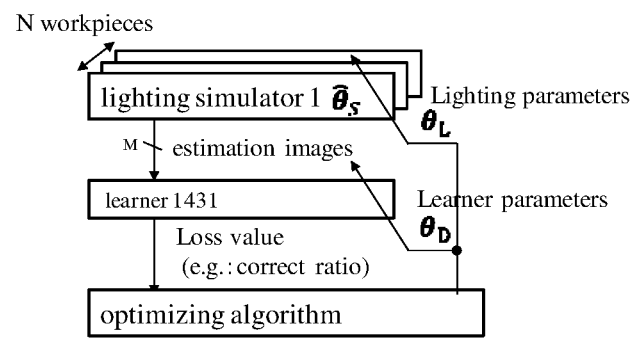
Figure 6B:
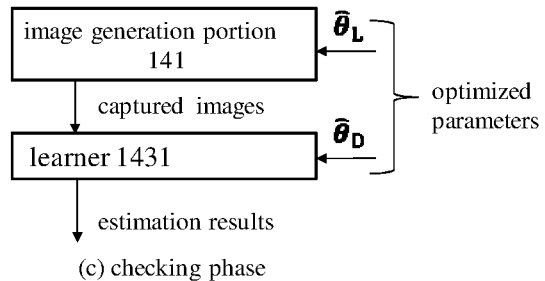
Figure 7:
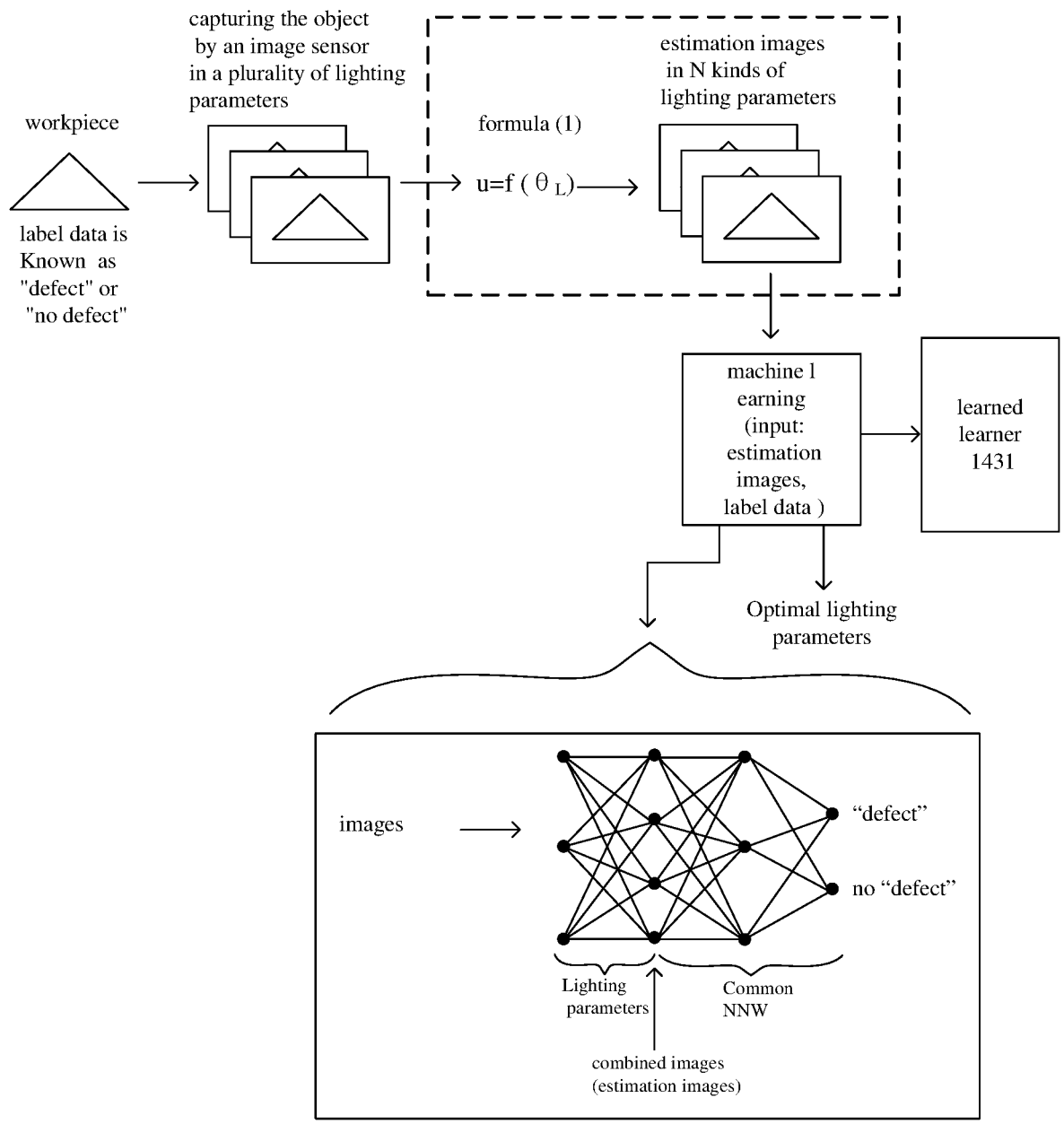
Figure 8:
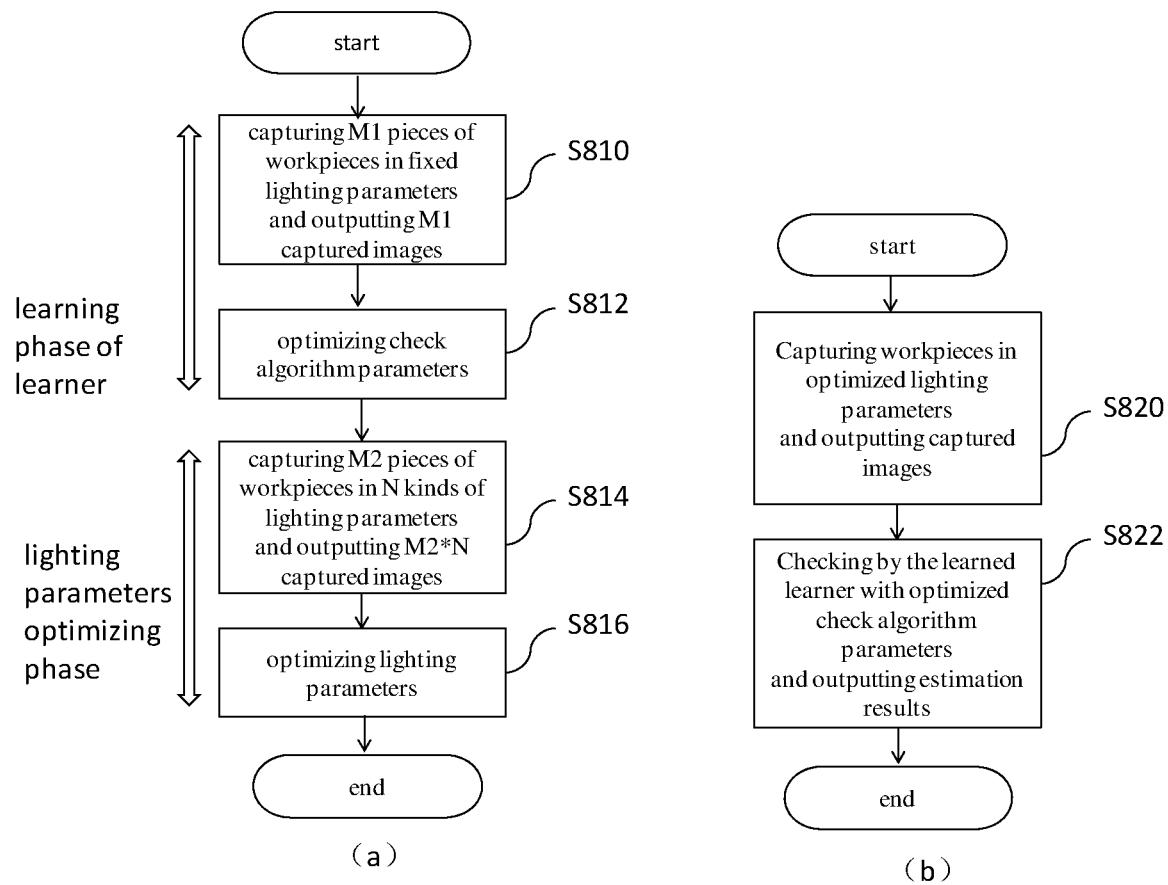
Figure 9:
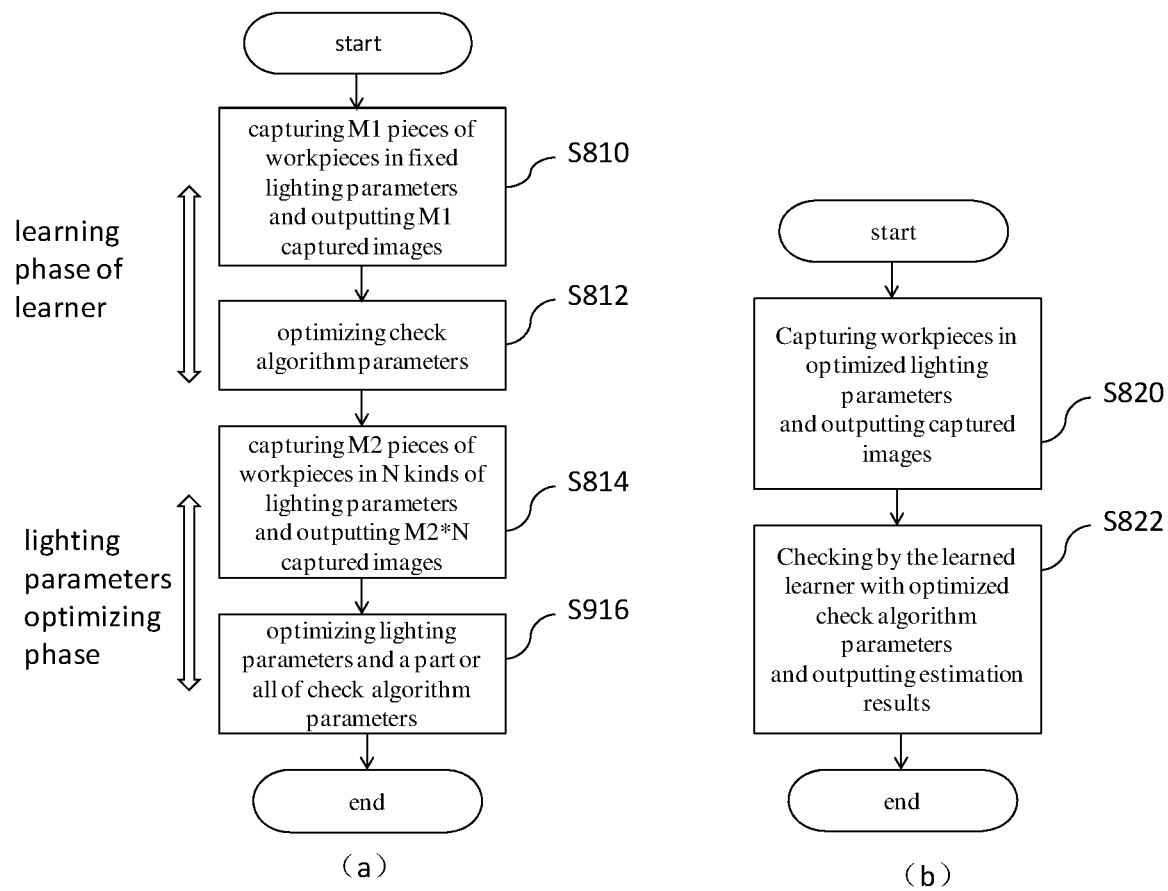
Figure 10:
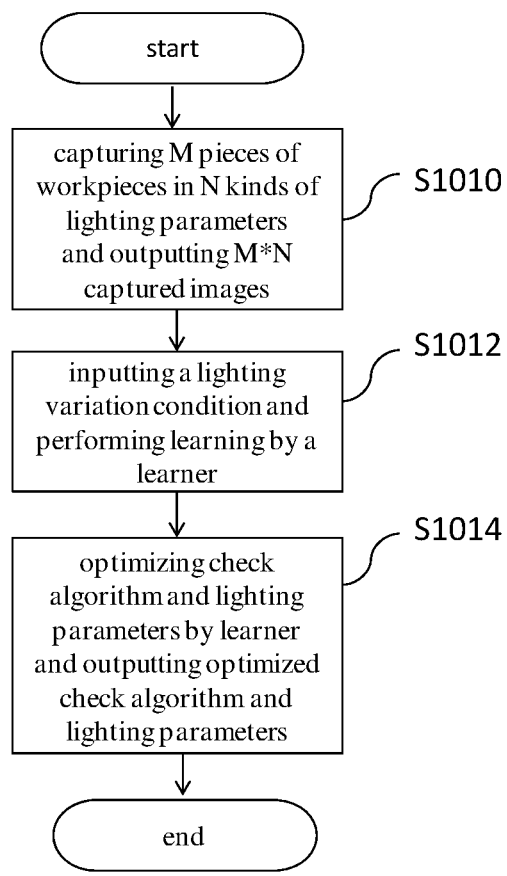
Figure 11:
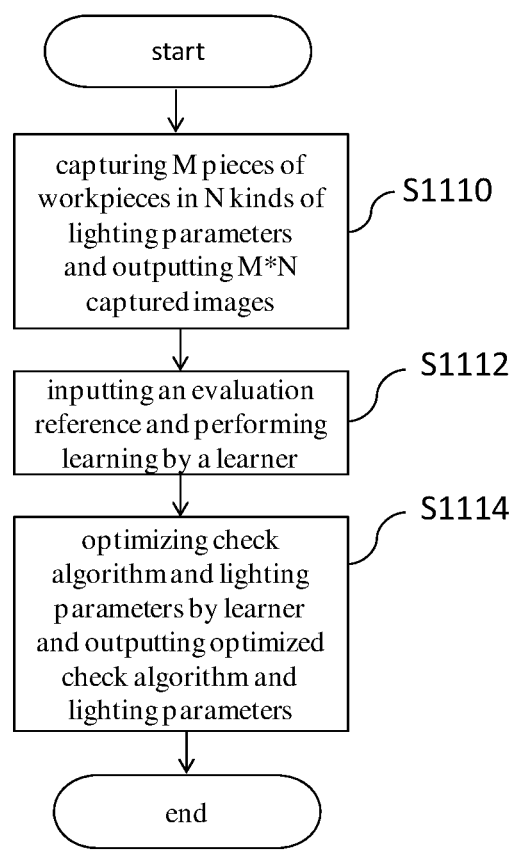
Figure 12:
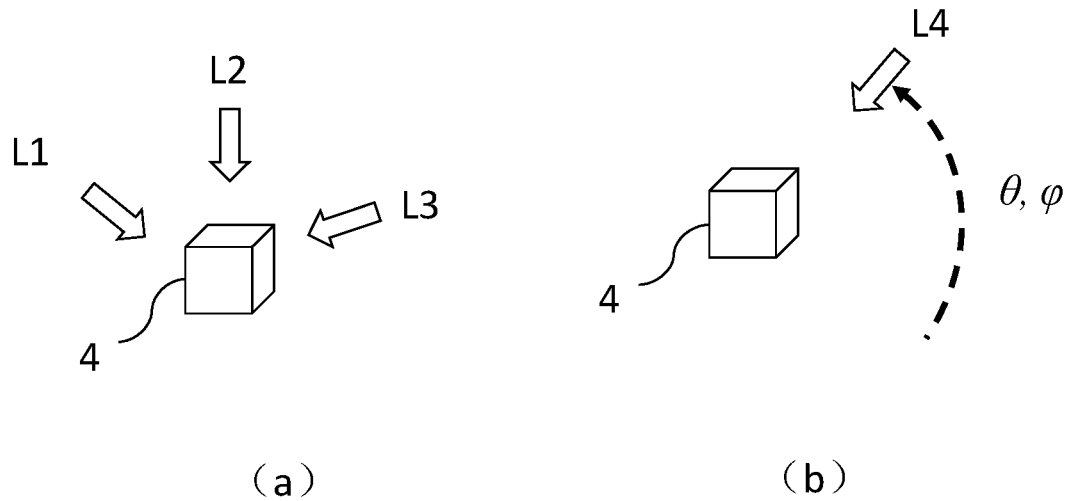
Figure 13:
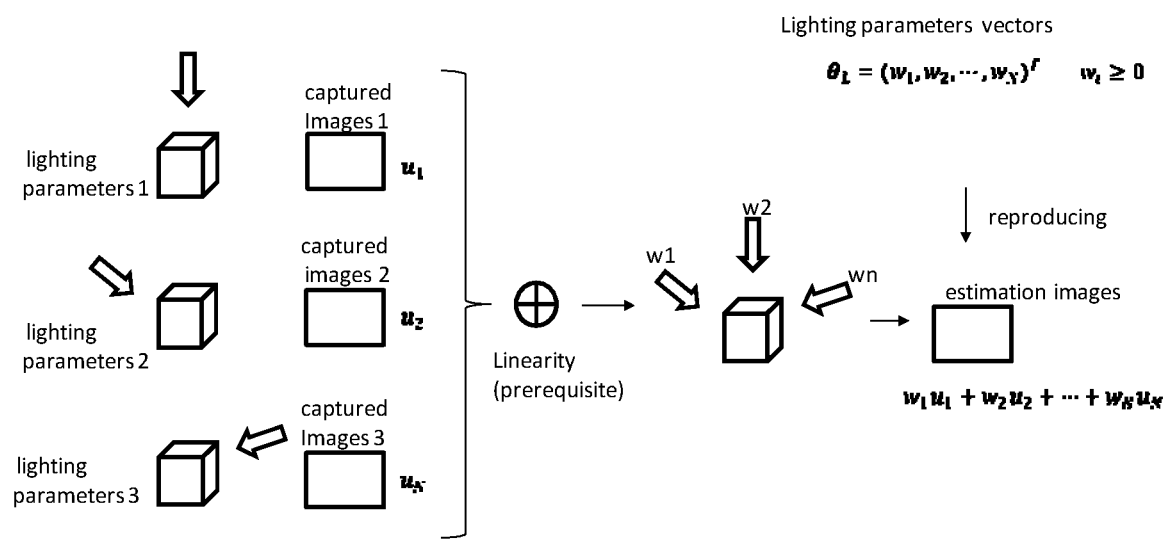
Figure 14:
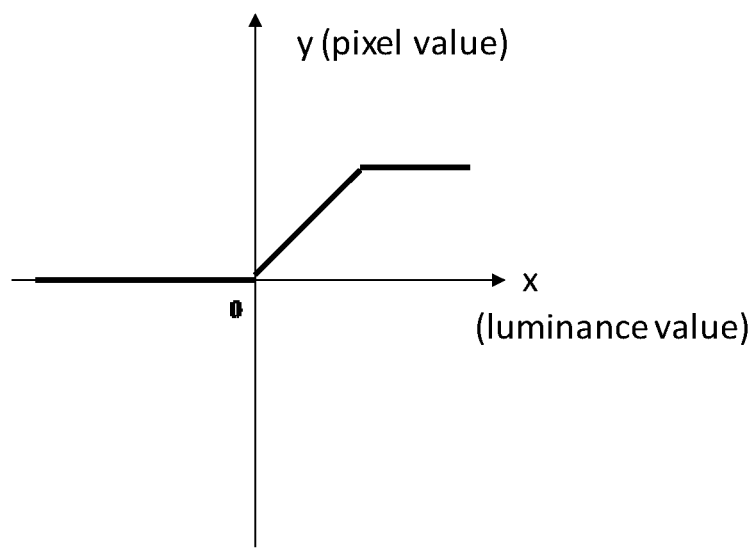

(a) and (b) of FIG. 4 are respectively flowcharts of a learning stage and check stage of a machine learning model in a method for setting a lighting condition according to an implementation mode of the present disclosure;

FIG. 5 is a flowchart of a method for setting a lighting condition according to an implementation mode of the present disclosure;

FIG. 6A and FIG. 6B are flowcharts illustrating steps in FIG. 5 in detail;

FIG. 7 is a schematic flowchart of the method for setting a lighting condition shown in FIG. 5;

(a) and (b) of FIG. 8 are respectively flowcharts of a learning stage and check stage of a machine learning model in a method for setting a lighting condition according to another implementation mode of the present disclosure;

(a) and (b) of FIG. 9 are respectively flowcharts of a learning stage and check stage of a machine learning model in one modification of the method for setting a lighting condition shown in FIG. 8;

FIG. 10 is a flowchart of a method for setting a lighting condition according to another implementation mode of the present disclosure;

FIG. 11 is a flowchart of a method for setting a lighting condition according to another implementation mode of the present disclosure;

(a) and (b) of FIG. 12 are schematic diagrams of a lighting model for describing a method for setting a lighting condition according to an implementation mode of the present disclosure;

FIG. 13 is a schematic diagram showing an example of a linear lighting model; and FIG. 14 is a schematic diagram showing an example of a linear luminance function.

DETAILED DESCRIPTION OF THE EMBODIMENTS

In sequence to make those skilled in the art better understand the present disclosure, the implementation modes of the present disclosure are clearly and completely described below in combination with the accompanying drawings of the present disclosure. Apparently, the described implementation modes are merely a part of the implementation modes of the present disclosure, rather than all of the implementation modes. All other implementation modes obtained by those skilled in the art based on the implementation modes in the present disclosure, without creative efforts, shall fall within the protection scope of the present disclosure.

In the present disclosure, an object is lighted by multiple light sources with variable lighting parameters. The lighting parameters may include, for example, luminous positions, luminous intensity and chromaticity of the light sources. Under a lighting condition, the object is captured by an image sensor (for example, a camera) to obtain captured images. A machine learning model is trained by estimation images generated by processing the captured images, so as to endow the machine learning model with a capability of checking the object. The captured images or the estimation images may be associated with the lighting parameters in advance, so that the lighting parameters and check algorithm parameters may be regulated at the same time in a process of training the machine learning model. Here, "check algorithm parameters" refer to parameters of a check algorithm when checking an object by a machine learning model. Therefore, compared with pure regulation of the lighting parameters and lighting with the lighting parameters for obtaining the captured images for learning, the method for checking the object in the present disclosure simplifies operations and reduces a system load.

The implementation modes of the present disclosure are described with reference to the accompanying drawings in detail. It is important to note that the same or corresponding parts in the drawings are marked with the same marks and will not be repeatedly described.

At first, a system composition example of a check system 1 according to an implementation mode of the present disclosure is described. The check system 1 according to the implementation mode checks a checked object on the basis of captured images generated by capturing the checked object. The checked object may be a workpiece on a production line. Checking may be, for example, appearance checking or appearance measurement over the workpiece.

Figure 1:
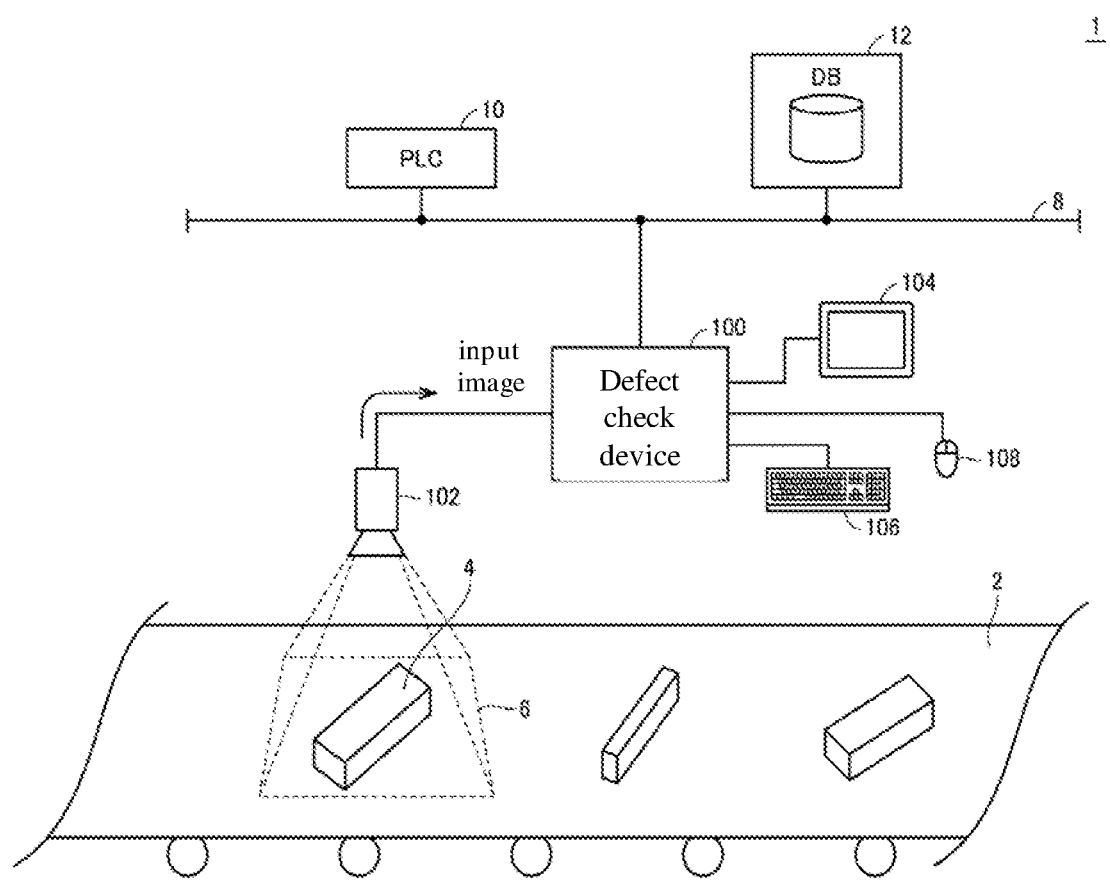
FIG. 1 is a schematic diagram of a system composition example of a check system according to an implementation mode of the present disclosure.

FIG. 1 is a schematic diagram of the system composition example of the check system 1 according to the implementation mode. Referring to FIG. 1, the check system 1 executes image analysis processing on an input image obtained by imaging, the checked object, i.e., the workpiece 4, for example, conveyed on a belt conveyor 2, thereby completing appearance checking or appearance measurement over the workpiece 4. In the descriptions made below, an application example of checking whether there exists a defect in a surface of the workpiece 4 is described as a typical example of image analysis processing. However, these do not form any limit, and the check system may further be applied to specification of a defect type, or measurement of an appearance shape or the like.

An upper portion of the belt conveyor 2 is provided with a camera 102 serving as an imaging portion, and an imaging view 6 of the camera 102 forms a predetermined region including the belt conveyor 2. Image data (called as an "input image" hereinafter) generated by imaging of the camera 102 is sent to a defect check device 100. Imaging of the camera 102 is executed according to a period or an event.

The defect check device 100 may be provided with a learner, and the learner may be provided with a Convolutional Neural Network (CNN) engine. By the CNN engine, a feature detection image of each level is generated according to the input image. Whether there exists a defect in the object workpiece or not is judged on the basis of the one or more feature detection images which are generated. Or, a size, position or the like of the defect may be detected.

The defect check device 100 is connected with a Programmable Logic Controller (PLC) 10, a database device 12 and the like through an upper network 8. A detection result in the defect check device 100 may also be sent to the PLC 10 and/or the database device 12. It is important to note that, besides the PLC 10 and the database device 12, any device may also be connected to the upper network 8.

A display 104 for displaying a processing state, the detection result or the like and a keyboard 106 and mouse 108 serving as input portions receiving an operation of a user may further be connected to the defect check device 100.

Second, a hardware composition of a defect check device 100 included in a check system 10 according to an implementation mode of the present disclosure is described.

Figure 2:
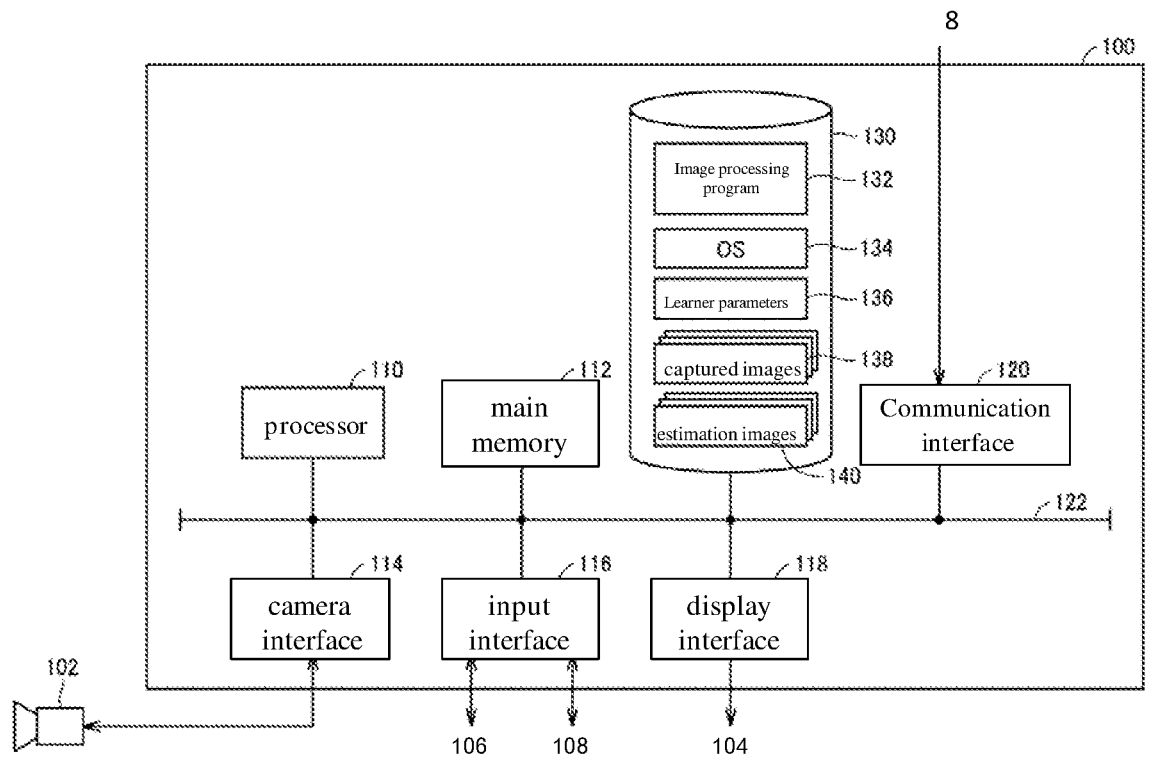
FIG. 2 is a schematic diagram of a hardware composition of a defect check device according to an implementation mode of the present disclosure.

FIG. 2 is a schematic diagram of the hardware composition of the defect check device 100 according to the implementation mode. The defect check device 100 may be an example of a "system for setting a lighting condition when an object is checked" in the present disclosure. Referring to FIG. 2, as an example, the defect check device 100 may be implemented according to a universal computer formed by a universal computer architecture. The defect check device 100 includes a processor 110, a main memory 112, a camera interface 114, an input interface 116, a display interface 118, a communication interface 120 and a memory 130. Typically, these components are connected through an internal bus 122, thereby communicating with one another.

The processor 110 executes a program stored in the memory 130 in the main memory 112, thereby realizing functions and processing described hereinafter. The main memory 112 is formed by a nonvolatile memory, and realizes a function of a working memory required by program execution of the processor 110.

The camera interface 114 is connected with a camera 102, and acquires an input image obtained by imaging of the camera 102. The camera interface 114 may further indicate an imaging timing and the like to the camera 102.

The input interface 116 is connected with the input portions such as the keyboard 106 and the mouse 108, and acquires an instruction represented by an operation of a user over the input portions and the like.

The display interface 118 is connected with the display 104, and outputs various processing results generated by program execution of the processor 110 to the display 104.

The communication interface 120 is responsible for processing of communicating with a PLC 10, a database device 12 and the like through an upper network 8.

The program enabling a computer such as an image processing program 132 and an Operating System (OS) 134 to realize the function of the defect check device 100 is stored in the memory 130. Learner parameters 136 configured to implement image detection processing, input images, i.e., captured images 138, acquired from the camera 102 and estimation images 140 obtained on the basis of the captured images 138, which are mentioned hereinafter, may further be stored in the memory 130. The learner parameters 136 may include, for example, various parameters applied to a learning stage and check stage of a machine learning model such as lighting parameters and check algorithm parameters.

The image processing program 132 stored in the memory 130 may be installed in the defect check device 100 through an optical recording medium such as a Digital Versatile Disc (DVD) or a semiconductor recording medium such as a Universal Serial Bus (USB) memory. Or, the image processing program 132 may further be downloaded from a server device on a network and the like.

During implementation with such a universal computer, processing may be performed by calling necessary software modules in software modules provided by the OS 134 according to a predetermined sequence and/or opportunity, thereby realizing a part of functions according to the implementation mode. That is, the image processing program 132 according to the implementation mode does not include all software modules for realizing the functions according to the implementation mode, and may provide necessary functions by cooperating with the OS.

The image processing program 132 according to the implementation mode may further be provided by being combined in a part of another program. Under such a condition, the image processing program 132 does not include modules included in the other program which is combined, and cooperates with the other program to execute processing. Therefore, the image processing program 132 according to the implementation mode may further adopt a manner of combination in the other program.

FIG. 2 shows an example of implementing the defect check device 100 by virtue of the universal computer. However, no limits are formed. A part or all of the functions may also be realized through a dedicated circuit (for example, an Application Specific Integrated Circuit (ASIC) or a Field-Programmable Gate Array (FPGA)). Moreover, an external device connected with the network may also be responsible for a part of processing.

Figure 3:
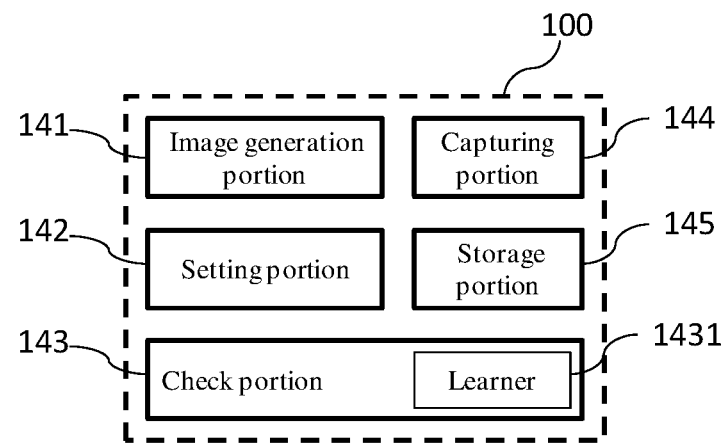
FIG. 3 is a schematic diagram of functional modules of a defect check device according to an implementation mode of the present disclosure.

FIG. 3 is a schematic diagram of functional modules of a defect check device 100 according to an implementation mode of the present disclosure. As shown in FIG. 3, the defect check device 100 may include an image generation portion 141, a setting portion 142, a check portion 143, a capturing portion 144 and a storage portion 145.

The image generation portion 141, the setting portion 142 and the check portion 143 of the defect check device 100 may be implemented by virtue of one or more universal processors. However, no limits are formed. A part or all of the functions may also be realized through a dedicated circuit (for example, an Application Specific Integrated Circuit (ASIC) or a Field-Programmable Gate Array (FPGA)). Moreover, an external device connected with the network may also be responsible for a part of processing of these portions.

Here, the capturing portion 144 is a specific example of an "acquisition portion" in the present disclosure. As another example, the defect check device 100 may also not include the capturing portion 143, and externally receives a captured image of a workpiece 4. The image generation portion 141 is a specific example of a "generation portion" in the present disclosure. The setting portion 142 is a specific example of a "setting portion" in the present disclosure. A combination of the capturing portion 144, the image generation portion 141 and the setting portion 142 is a specific example of a "device for setting a lighting condition when an object is checked" in the present disclosure.

In addition, the check portion 143 is a specific example of a "check module" in the present disclosure. A learner 1431 is a specific example of an implementation mode of a "machine learning model" in the present disclosure. The check portion 143 outputs a final check result about the workpiece 4. For example, under the condition that the learner 1431 is a CNN configured to generate a feature extracted from an image, the check portion 143 may further include, for example, a determination device applying a determination reference to the feature extracted by the learner 1431 to generate the final check result.

The image generation portion 141 is configured to generate an estimation image of the workpiece 4 under the condition of lighting with variable lighting parameters (varied predetermined lighting parameters) on the basis of a captured images obtained by capturing of the capturing portion 144. That is, the estimation images are not practically captured, but are images, obtained by simulating the lighting parameters adopted for capturing and performing estimation, of the workpiece 4 under the condition of lighting with the simulated lighting parameters.

The setting portion 142 applies the estimation image corresponding to the variable lighting parameter and corresponding label data of the workpiece 4 to learning of the learner 1431, and sets the lighting parameter used when the check portion 143 checks the workpiece 4 by virtue of the learner 1431 which has performed learning on the basis of a comparison result between an estimation result of the learner 1431 and the label data of the workpiece. A setting method will be described below in detail.

The "label data" herein is configured to represent checked features of the workpiece 4. For example, the label data may be data representing whether the workpiece 4 is an accepted product or a rejected product, and may also be data representing appearance features (for example, scratches and size) of the workpiece 4. The content of the label data is not specifically limited, as long as expected checked features of the workpiece 4 are represented.

The check portion 143 checks the workpiece 4 on a belt conveyor 2. The check portion 143 may include the learner 1431, thereby checking the workpiece 4 through a trained machine learning model.

The capturing portion 144 captures the workpiece 4 through an image sensor. The image sensor may be, for example, a camera, there may be one or more cameras, and moreover, their capturing parameters such as aperture sizes and shutter speeds are variable.

The storage portion 145 is configured to store a program or data required by work of the defect check device 100. The defect check device 100 may also not include the storage portion 145.

A method for setting a lighting condition according to an implementation mode of the present disclosure will be summarized below with reference to FIG. 4. (a) and (b) of FIG. 4 are respectively flowcharts of a learning stage and check stage of a machine learning model in a method for setting a lighting condition according to an implementation mode of the present disclosure.

As shown in (a) of FIG. 4, in Step S410, a capturing portion 144 captures a workpiece. The workpiece may be captured for many times under the condition of lighting with different lighting parameters, thereby obtaining multiple captured images about the workpiece. These captured images correspond to a set of lighting parameters respectively, and for example, each set of lighting parameters may include parameters such as light sources which are turned on and luminance of the light sources which are turned on.

In Step S412, a learner 1431 performs learning by virtue of estimation images obtained on the basis of these captured images (the method of obtaining estimation images will be described below in detail with reference to FIGS. 5 to 7). Since each estimation image has an associated variable lighting parameter, by learning, an evaluation function may be optimized to obtain optimal lighting parameters and check algorithm parameters, that is, the optimal lighting parameters and check algorithm parameters are selected to optimize a correct ratio of a check result output by a check portion 143. Here, the "lighting parameters" refer to lighting parameters used when the check portion 143 checks the workpiece, and the "check algorithm parameters" refer to parameters of a check algorithm used when the check portion 143 checks the workpiece.

As shown in (b) of FIG. 4, in Step S420, lighting is performed with the optimized lighting parameters obtained in Step S412, and the capturing portion 144 captures the workpiece 4 to obtain captured images. In Step S422, the learner 1431 checks a defect of the workpiece 4 by virtue of these images.

In the method for setting the lighting condition shown in FIG. 4, the check lighting parameters and the check algorithm parameters are regulated at the same time, that is, the lighting parameters are equivalently added into the algorithm parameters required to be regulated, so that labor hours may be reduced, dependence on a worker is reduced, moreover, a calculation load of the whole system is reduced, and check efficiency is improved.

FIG. 5 is a flowchart of a method for setting a lighting condition after the method for setting the lighting condition shown in (a) of FIG. 4 is further detailed. (a) of FIG. 6A and (a) of FIG. 6B are detailed flowcharts of Step S54 of FIG. 5, (b) of FIG. 6A and (b) of FIG. 6B are detailed flowcharts of Step S56 of FIG. 5, and (c) of FIG. 6B is a schematic flowchart corresponding to the check phase shown in (b) of FIG. 4. FIG. 7 is a schematic flowchart of the method for setting a lighting condition shown in FIG. 5. Each step of a method for setting a lighting condition according to an implementation mode of the present disclosure will be described below with reference to FIGS. 5 to 7 in detail. For convenient description, the concept of "lighting simulator" is introduced below.

In the present disclosure, a check algorithm is implemented by a learner 1431. A training evaluation reference of the learner 1431 is usually called as a Loss value, and if an accepted/rejected product judgment problem is involved, a correct ratio of PASS/FAIL is represented by Cross Entropy and the like. If a check content is a regression problem of measurement of a length and the like of a workpiece 4, an error occurrence distribution is modeled through multidimensional normal distribution, and its logarithm likelihood function is used as the Loss value.

Under a general condition, during learning of a machine-learning-based check algorithm, multiple pieces of teacher data (PASS/FAIL in case of the judgment problem and correct ratio in case of the regression problem) and learning sample images are input in advance, and parameter optimization is performed in a manner of minimizing the Loss value, wherein the Loss value is a reference of whether these learning sample images are correctly estimated or not.

At present, when foregoing lighting optimization is implemented, for these learning sample images, captured images under various lighting conditions set according to requirements are required to be reproduced on a computer. Therefore, in the present disclosure, a "lighting simulator" is introduced, and when lighting parameters are provided (for example, a set of parameters of intensity, position, incident angle and the like), the captured images under this lighting condition are calculated.

The lighting simulator is defined as follows. When a lighting parameter vector is $\theta_L$ and a captured image vector captured under such lighting is u, the lighting simulator is defined to be a function f, as shown in formula (1):

$$u = f(\theta_L) \qquad (1).$$

A specific definition of the function adopts different formulae according to a lighting model. It is important to note that the function is a function generating captured images only for a specific workpiece. When multiple workpieces are processed, an index i identifying a workpiece individual is adopted as a subscript, marked as $f_i$.

The lighting simulator function $f_i$ adopts N captured images $\{u_j\}_{j=1}^N$ obtained by sequentially changing a lighting model $\{\theta_L^{(j)}\}_{j=1}^N$ as training images, thereby estimating parameters. A parameter estimation method in a specific example of the lighting simulator will be described hereinafter.

Referring to FIG. 5, in Step S50, a capturing portion 144 captures a workpiece. Step S50 may be, for example, similar to Step S410. As a preparation stage for optimization, for all workpieces (1≤i≤M), captured images $u_j$ (1≤j≤N) configured to calculate respective lighting simulators $f_i$ are captured, and respective lighting parameters are acquired.

Here, the lighting parameters of each light source may be changed. For example, a luminous position and/or luminous intensity of each light source may be changed, so that different lighting may be provided for the workpiece 4. Moreover, the workpiece 4 has corresponding known label data, and the label data is configured to represent checked features of the workpiece 4. For example, the label data may be data representing whether the workpiece 4 is an accepted product or a rejected product, and may also be data representing appearance features (for example, scratches and size) of the workpiece 4. A content of the label data is not specifically limited, as long as expected checked features of the workpiece 4 are represented.

In Step S52, an image generation portion 141 associates captured images and corresponding lighting parameters to obtain image data sets. The image data sets may further include, for example, corresponding capturing parameters, for example, an aperture size and a shutter speed. The image data sets may be stored, for example, in a storage portion 145.

In Step S54, the image generation portion 141 generates estimation images of each workpiece under the condition of lighting with variable lighting parameters on the basis of the image data sets.

Specifically, as shown in (a) of FIG. 6A and (a) of FIG. 6B, in Step S540, the lighting simulator $f_i$ of each workpiece generates initial estimation images on the basis of initial simulator parameters, and the image generation portion 141 compares the initial estimation images with the captured images of the workpiece.

In Step S542, the simulator parameters $\theta_S$ are regulated on the basis of differences, and optimized simulator parameters are finally obtained. The initial simulator parameters are not necessary in the case of a simple lighting simulator model such as linear model. Note that the simulator parameter is different from the lighting parameters which define lighting condition. Such an optimization process may be completed in a machine learning manner. In Step S544, the lighting simulator generates the estimation images during lighting with the variable lighting parameters on the basis of the optimized lighting simulator parameters $\theta_S$.

Back to FIG. 5, in Step S56, the learner 1431 performs learning on the basis of the estimation images to obtain the lighting parameters adopted when the workpiece is checked, specifically referring to (b) of FIG. 6A and (b) of FIG. 6B.

In (b) of FIG. 6A and (b) of FIG. 6B, in Step S560, the estimation images are input into the learner 1431 for learning.

During appearance checking, a Loss function of the machine-learning-based check algorithm is usually marked as L(u, v|θD), wherein $\theta_D$ is a parameter vector of the check algorithm, for example, the check algorithm includes all weights of connecting lines during deep learning. Moreover, u is the captured image, and v is a label of the image. Under a general condition, when a data set for learning is represented as $\{(u_i, v_i)\}_{i=1}^{M}$, an optimal learning parameter $\hat{\theta}_D$ is calculated through formula (2):

$$\hat{\theta}_D = \arg\min_{\theta_D} \sum_{i=1}^{M} L(u_i, v_i | \theta_D). \tag{2}$$

While in the learner 1431, when a lighting simulator set corresponding to a sample set of the workpiece is represented as $\{f_i\}_{i=1}^{M}$, the captured images u are replaced with simulator images $f(\theta_L)$ to obtain a relationship shown in formula (3):

$$L(u,v|\theta_D)=L(f(\theta_L),v|\theta_D)=L(f,v|\theta_L,\theta_D) \tag{3}.$$

By the formula, the optimal lighting and check algorithm parameters may be calculated through formula (4):

$$(\hat{\theta}_L, \hat{\theta}_D) = \arg\min_{\theta_L, \theta_D} \sum_{i=1}^{M} L(f_i, v_i | \theta_L, \theta_D). \tag{4}$$

However, when optimization of the formula is implemented, under a general condition, due to a physical constraint condition (for example, negative luminance is meaningless), a value of the lighting parameter vector is ranged, and optimization is performed in such an effective range of the parameter value. In addition, the method of calculating $\theta_L$ will described below in combination with FIG. 11 and FIG. 12.

In Step S562, the learner 1431 performs learning by learning data including the estimation images and the corresponding label data of the workpiece 4 to obtain an estimation result. In Step S564, the check algorithm parameters of the learner 1431 are optimized on the basis of formula (4) to make the estimation result of the learner 1431 consistent with the label data.

As shown in FIG. 7, for example, in the case where the learner 1431 performs depth learning using a neural network, the output of the neural network is made to be consistent with the label data so that the check algorithm parameters and the lighting parameters are optimized at the same time, and thereby a neural network which has already performed learning and has optimal lighting parameters can be obtained. The learner 1431 which has already performed learning can select lighting parameters to increase the correct ratio of the test result of the workpiece 4.

In addition, the processes in the dashed block are not necessarily proceeded. For example, there are cases that the processes in the dashed block are not proceeded according to the kind of the lighting model. In such cases, the images of the object captured by an image sensor in a plurality of lighting parameters, rather than the estimation images, are used for machine learning directly.

In the method for setting the lighting parameters according to the implementation mode of the present disclosure with reference to FIGS. 5 to 7, the check lighting parameters and the check algorithm parameters are optimized at the same time, so that labor hours may be reduced, and moreover, direct optimization of the evaluation reference may be implemented only from the angle of checking accuracy (accepted/rejected product judgment or measured value). In addition, direct optimization of a capturing system and an image processing system for a purpose as a whole may be implemented, for example, a good lighting design for check algorithms and the check algorithm most suitable for such lighting.

Moreover, in the method for setting the lighting condition, the lighting simulator is introduced, and it is unnecessary to capture a large number of images of the workpiece, so that capturing time is saved, the labor hours are reduced, and dependence on a worker is reduced.

In addition, in the method for setting the lighting parameters according to the implementation mode of the present disclosure with reference to FIG. 5, FIG. 6A and FIG. 6B, multiple corresponding image data sets may also be prepared for multiple types of workpieces 4. Therefore, multiple types of estimation images respectively corresponding to the workpieces 4 of each type during lighting with the variable lighting parameters may be generated on the basis of the multiple image data sets.

Therefore, universality of the check portion 143 may be improved, and image capturing, lighting parameter setting and the like are not required to be performed for the workpieces of each type respectively.

(a) and (b) of FIG. 8 are respectively flowcharts of a learning stage and check stage of a machine learning model in a method for setting a lighting condition according to another implementation mode of the present disclosure. A principle of the method is described below at first.

Under a general condition, learning of a machine-learning-based check algorithm requires a large number of training images. This problem is particularly obvious in a method with a large number of parameters such as deep learning, wherein the problem is that M*N images are required to be obtained in the method. When a value of M is very large, a large number of images are required to be captured.

As a solution to the problem, check algorithm parameters may be calculated in advance through training images obtained under a fixed capturing condition only for the check algorithm requiring a large number of training images. In other words, an optimal solution is calculated not by changing $\theta_L$ and $\theta_D$ at the same time, and $\theta_L$ is calculated by a lighting simulator for a few workpiece samples after $\theta_D$ is calculated. Under a general condition, this method may be considered to be reasonable because a number of lighting parameters is relatively small.

Specifically, two data sets $D_1=\{(u_i, v_i)\}_{i=1}^{M_1}$ and $D_2=\{(f_i, v_i)\}_{i=1}^{M_2}$ are prepared, and for optimization of two stages, optimal lighting parameters are calculated by formula (5) and formula (6):

$$\hat{\theta}_D = \underset{\theta_D}{\operatorname{argmin}} \sum_{(u,v) \in D_1} L(u, v \mid \theta_D), \text{ and} \quad (5)$$

$$\hat{\theta}_L = \underset{\theta_L}{\operatorname{argmin}} \sum_{(f,v) \in D_2} L(f, v \mid \theta_L, \hat{\theta}_D). \quad (6)$$

In the foregoing method, it is set that $M_1 > M_2$, a number of captured images required by learning may be reduced from M*N to $M_1 + M_2 \times N$. In the foregoing method, existing fixed check algorithm parameters may also be used, and only lighting parameters are calculated.

A flow of the method is described herein with reference to FIG. 8 in detail. As shown in (a) of FIG. 8, in Step S810, $M_1$ workpieces are captured with fixed lighting parameters to obtain $M_1$ captured images. In Step S812, a learner 1431 performs learning by the $M_1$ captured images to optimize check algorithm parameters. In Step S814, $M_2$ workpieces in the $M_1$ workpieces are captured under N types of lighting parameters to obtain $M_2*N$ captured images.

In Step S816, estimation images of a workpiece 4 during lighting with variable lighting parameters are generated on the basis of image data sets obtained by associating the $M_2*N$ captured images and the lighting parameters corresponding to these captured images. These estimation images are used for the learner 1431 which has performed learning. A lighting condition adopted when a check portion 143 checks the workpiece 4 is set on the basis of a comparison result between an estimation result of the learner 1431 and label data. As an example of the comparison, for example, after the learner 1431 has already performed learning using a workpiece image under N lighting parameters as a test image input, a lighting parameter that maximizes the correct ratio of the estimation result of the learner 1431 is selected as the lighting parameter used when checking the workpiece 4.

After the learning stage shown in (a) of FIG. 8, as shown in (b) of FIG. 8, in Step S820, a workpiece is captured under check lighting parameters to obtain captured images. In Step S822, the check portion 143 analyzes the captured images to obtain a detection result about the workpiece.

According to the check method described with reference to FIG. 8, a system calculation amount during learning of a machine learning model may be reduced, a system load may be reduced, and a setting operation over the lighting parameters may be simplified.

In addition, optionally, in the foregoing method, the number of the captured images required by learning may also be reduced, thereby reducing labor hours and simplifying a parameter optimization procedure.

There may be various modifications for the method for setting a lighting condition described with reference to FIG. 8, and the modifications will be described in detail below with reference to FIG. 9. (a) and (b) of FIG. 9 are respectively flowcharts of a learning stage and check stage of a machine learning model in one modification of the method for setting a lighting condition shown in FIG. 8. In FIG. 9, the same or similar steps as those of FIG. 8 are marked with the same or similar reference numerals, and repeated description thereof is omitted.

During learning in Step S916, besides $\theta_L$, a part (recorded as $\theta'_D$) of the check algorithm parameters is also set to be a variable value, and is regulated again, as shown in formula (7) and formula (8). Therefore, additional learning may be executed only by the light simulator for a few workpiece samples, and on the other aspect, the problem of incapability of forming a learner most suitable for lighting may be locally solved:

$$\hat{\theta}_D = \underset{\theta_D}{\operatorname{argmin}} \sum_{(u,v) \in D_1} L(u, v \mid \theta_D), \text{ and} \quad (7)$$

$$(\hat{\theta}_L, \hat{\theta}'_D) = \underset{\theta_L, \theta'_D}{\operatorname{argmin}} \sum_{(f,v) \in D_2} L(f, v \mid \theta_L, \hat{\theta}_D). \quad (8)$$

Similarly, the number of the captured images required by learning may be reduced, and moreover, the learner most suitable for lighting to a certain extent may be formed.

Moreover, in the check method described with reference to FIG. 9, all the parameters of the check algorithm may also be regulated again during learning in Step S916. Under such a condition, learning in Step S812 has a pretraining function.

FIG. 10 is a flowchart of a check method according to another implementation mode of the present disclosure. According to the check method described with reference to FIG. 10, robustness for small changes of a lighting and imaging system may be improved.

When the same check is performed on a production line in parallel, it is difficult to manufacture a copy completely the same as the whole imaging system including lighting. Under a general condition, there may be an individual difference due to a deviation of a mounting position of a camera or lighting and the like.

When the optimal lighting parameters calculated by the method of the present disclosure are applied to a copy environment different from a capturing environment, performance may be damaged due to an individual difference of the imaging system. For preventing this problem, stable parameters may be calculated for small changes by an evaluation function of performing averaging after noise is added into the lighting parameters. Specifically, the foregoing Loss function L is replaced with $L_\varepsilon$ defined in formula (9), thereby calculating the lighting parameters and the check algorithm parameters:

$$L_\varepsilon(f_i, v_i | \theta_L, \theta_D) = \mathbb{E}_\varepsilon L(f_i, v_i | \theta_L + \varepsilon, \theta_D) \qquad (9),$$

where ε is a freely distributed noise vector. Under a general condition, center-zero multidimensional normal distribution, uniform distribution within a range or the like may be utilized. This is direct application of the concept of "Augmentation" of an input image during deep learning to the lighting parameters.

The flow of the method is described herein with reference to FIG. 10 in detail. As shown in FIG. 10, in Step S1010, the workpiece is captured to obtain captured images. The step may refer to S410, S50 and S810. In Step S1012, estimation images obtained according to the captured images are input into the learner 1431, and a lighting variation condition is further input for learning. The "lighting variation condition" mentioned herein may include the small changes of the environment, and may further include small changes of light sources and an image sensor. In Step S1014, a loss average of a loss function of the learner 1431 for the lighting parameters within a predetermined range is minimized to obtain optimized lighting parameters, wherein the lighting parameters are variables of the loss function.

In the check method described with reference to FIG. 10, environmental influence is considered, so that the robustness for small changes of the lighting parameters may be improved, and performance of the whole check system is improved.

FIG. 11 is a flowchart of a check method according to another implementation mode of the present disclosure. According to the check method described with reference to FIG. 11, robustness for changes of a workpiece may be improved on the basis of two evaluation functions.

For ensuring the robustness of check performance for the changes of the workpiece, under a general condition, there exist modifications of adding workpiece sample images or adding the sample images by applying an enhancement technology.

In the foregoing method for optimization including lighting, addition of the workpiece sample images is equivalent to increase of an example number of a light simulator. Therefore, compared with pure capturing of sample images, there exists a problem of troublesomeness. As a method simply solving the problem, a method related to the evaluation function may be considered.

According to the present disclosure, there is achieved the advantage that a correct ratio (Loss value) of a check algorithm may be directly maximized. On the other aspect, no reference for directly visually evaluating captured images is included, it is impossible to distinguish whether lighting parameters are turned into lighting parameters of practical lighting for checking a defect of an object or unusual lighting parameters which are optimized for a specified workpiece configuration. When a check image is evaluated to be good or not by eyes, performance of the check algorithm may not be directly maximized, but evaluation is performed on the basis of a feeling of a human and priori knowledge of experiences, so that the advantage of ensuring the robustness is achieved. Therefore, as shown in formula (10), a human-based subjective faculty evaluation reference h(u) (for example, contrast in a region) may be added to the Loss function to implement optimization:

$$L'(f_i, v_i | \theta_L, \theta_D) = L(f_i, v_i | \theta_L, \theta_D) + \lambda h(f_i(\theta_L)) \qquad (10),$$

where λ is a balance parameter determining the one importance should be attached to in the performance (Loss value) of the check algorithm and the faculty evaluation reference.

The flow of the method is described herein with reference to FIG. 11 in detail. As shown in FIG. 11, in Step S1110, the workpiece is captured to obtain captured images. The step may refer to S410, S50 and S810. In Step S1112, estimation images obtained on the basis of the captured images are input into the learner 1431, and an evaluation reference is further input for learning. The "evaluation reference" mentioned herein may include the foregoing evaluation reference based on the feeling of the human and the priori knowledge of experiences, and may also include an evaluation reference based on an existing mathematical algorithm for image analysis and the like. In Step S1114, the loss function of the learner 1431 is minimized to obtain optimized check lighting parameters.

As a manner applying the method, it may have the following modifications. For example, in the simplified method of calculating $\theta_L$ after $\theta_D$ is calculated, in the step of calculating each parameter, different A values or faculty evaluation references h(u) may be adopted. For example, $\theta_D$ is calculated only according to the correct ratio (λ=0) and a weight of the faculty evaluation reference is increased for $\theta_L$ (λ is set to be a relatively large value) and the like may be adopted.

In the check method described with reference to FIG. 11, the environmental influence is considered, so that the robustness for differences of workpieces may be improved, and the performance of the whole check system is improved.

A specific composition example of a lighting simulator will be described below. Under a general condition, lighting is uniquely defined through a far field mode of light, i.e., a continuous function (also called as an angular spectrum) representing an intensity distribution during splitting on the basis of parallel light. A resolution upper limit of the continuous function is determined by a size of a workpiece and an opening of an imaging system, and a relatively small workpiece may not have a relatively low angular resolution, so that a component with a relatively high space frequency may be ignored. However, even like this, a lighting model still has a great degree of freedom, and a certain parameter model is required by modeling.

According to a function expressing the specific constraint condition under which a lighting regulation parameter vector expresses parameterization under a specific lighting condition, lighting models may be divided into a linear model and a nonlinear model. Model parameters of the linear model may be estimated relatively easily, but the degree of freedom of lighting is limited.

The contents of the present disclosure have been described hereinabove with the check system shown in FIG. 1, but the contents of the present disclosure are not limited thereto. For example, the principle of the present disclosure may also be applied to various other situations where it is necessary to set lighting conditions and capture images. For example, the principle of the present disclosure may also be applied to a facial recognition system that takes a human face as an object, lights the human face and captures an image, uses the captured image as an input and recognizes the human face by machine learning.

In the case of a facial recognition system, the face is lit using a light source capable of changing lighting parameters and a camera is used to capture an image of the face under a variety of lighting conditions, where a known label data is given to the face, for example, the label data may be the person's name. Next, estimation images of the face may be generated based on the "lighting simulator" described above. And these estimation images and the label data of the face are used for the learning of the machine learning model of the facial recognition system, and based on the result of the comparison of the estimation result of this machine learning model with the label data of the face and by optimizing the lighting parameters and the check algorithm parameters of the machine learning model at the same time, both lighting conditions and check algorithm parameters are set. Here, the check algorithm parameters refer to check parameters used when the machine learning model is used for facial recognition.

Schematic diagrams of a lighting model for a method for setting a lighting condition according to an implementation mode of the present disclosure will be described below with reference to (a) and (b) of FIG. 12.

(a) of FIG. 12 shows an example of a linear lighting model. Under the linear lighting model, the estimation images of the workpiece 4 during lighting with the variable lighting parameters may be generated on the basis of a linear superposition sum of the captured images included in the image data sets and corresponding to the lighting parameters. Detailed descriptions will be made below.

A condition of 3 light sources is shown in (a) of FIG. 12. A light source L1, a light source L2 and a light source L3 light the workpiece 4 at different luminous positions. However, a number of the light sources is required to be more than 2 according to a requirement. For example, descriptions will be made below for the condition of N light sources. In short, the linear model regulates intensity of N pieces of fixed lighting.

When the intensity of the i-th ($1 \leq i \leq N$) lighting is $w_i$, the lighting parameter vector may be expressed as formula (11):

$$\theta_L = (w_1, w_2, \ldots, w_N)^T \quad (11).$$

When the far field mode of lighting is $\psi(\theta, \varphi)$, a specific expression in the linear model is as shown in formula (12):

$$\psi(\theta,\varphi) = w_1 \psi_1(\theta,\varphi) + w_2 \psi_2(\theta,\varphi) + \ldots + w_N \psi_N(\theta,\varphi) \quad (12).$$

In the formula, $\psi_i(\theta,\varphi)$ is a far field mode of the i-th lighting, and this is a model equivalent to a Radial Basis Function (RBF) network. According to the definition, this function is linear with respect to the lighting parameters, and is a linear system established by a superposition principle.

The relationship is also true for the captured images. For example, as shown in FIG. 13, when an image acquired when only the i-th lighting ($w_i = 1$) is turned on and the other lamps ($w_j = 0$, $j \neq i$) are turned off is recorded as $u_i$, an estimation image for the lighting parameter may be calculated according to formula (13):

$$u = w_1 u_1 + w_2 u_2 + \ldots + w_N u_N = A\theta_L \quad (13),$$

where A is usually a longitudinal matrix. In a practical environment, there may also occur a nonlinear phenomenon that directivity of the light source is changed by luminous intensity, but these changes may be supposed to be negligibly small. Moreover, due to pixel saturation and false linearity, a nonlinear linearity function g(x) is applied, and a model shown in formula (14) is obtained under a general condition, wherein g(x) executes operation for each element of the vector. An example of the linear luminance function is as shown in FIG. 14.

$$u = g(A\theta_L) \quad (14).$$

Under this condition, the parameters of the lighting simulator are turned into a matrix A, estimation (i.e., learning) of A becomes a problem of verifying a linear system, and measurement is performed for N times by utilizing any independent basis once for simple implementation.

Specifically, it is supposed that luminance of each piece of lighting is within a range making linearity true during measurement, and when N basic vectors used for measurement are set to be $\{\theta_L^{(i)}\}_{i=1}^{N}$, the following formula (15) and formula (16) are true:

$$[u_1, u_2, \ldots, u_N] = A[\theta_L^{(1)}, \theta_L^{(2)}, \ldots, \theta_L^{(N)}] + [n_1, n_2, \ldots, n_N] \quad (15), \text{ and}$$

$$U = AX + N \quad (16),$$

where $n_i$ is additional noise produced in a Complementary Metal Oxide Semiconductor (CMOS) sensor during capturing, and usually forms a normal distribution, and its dispersion is determined by a Signal-to-Noise (SN) ratio of the imaging system. When A is calculated according to the comparison expression, there exist various methods, for example, Maximum Likelihood (ML) estimation determined as Best Linear Unbiased Estimate (BLUE) and Minimum Mean Square Error (MMSE) estimation in Gaussian distribution conditioning with A and N both known, and under a normal situation, a statistical property of A under such a condition is unknown, so that ML estimation is adopted below. When an estimation value of A is $\hat{A}$, it may be calculated according to formula (17):

$$\hat{A} = UX^{-1} \quad (17).$$

At this moment, an estimation error is:

$$\mathbb{E}_{\hat{A}} \|\hat{A} - A\|_{HS}^2 = \mathbb{E}_N \|NX^{-1}\|_{HS}^2 = \mathbb{E}_N \langle NX^{-1}, NX^{-1} \rangle_{HS} = \quad (18)$$

$$\mathbb{E}_N \langle N^T N, X^{-1}(X^{-1})^T \rangle_{HS} = P \sum_{i=1}^{N} \frac{\sigma^2}{\lambda_i^2},$$

where $\sigma$ is a standard deviation of additive noise, $\lambda$ is a singular value of X, and P is a pixel number of the image. HS represents a Hilbert-Schmidt inner product or norm relative to the matrix. From the formula, it can be seen that a total amount of estimation errors is smaller when the singular value of X is larger, and equivalently, the SN ratio of the system is purely increased. When a sum of singular values of X has been determined (total signal power is constrained), the estimation error is lower when $\lambda$ are all the same values, and it is indicated that the lighting parameter vector for observation is most effective when utilizing an orthonormal basis. In view of the contents discussed above, three measurement modes of the lighting model are shown below.

(1) Standard Basis

When the standard basis of a purest mode is adopted, the lighting parameters for measurement may be represented as formula (19):

$$\theta_L^{(1)} = (1, 0, 0, \ldots, 0)^T \quad (19)$$
$$\theta_L^{(2)} = (0, 1, 0, \ldots, 0)^T$$
$$\vdots$$

This is the orthonormal basis, so that, according to what the discussions made above means, best estimation may be provided. However, an amount of light in the image is nonuniform, and may be influenced by noise or dark current.

(2) Linear Independence & Condition

As the lighting parameters for measurement, numerous modes may be considered which have linear independence. Therefore, the one meeting the condition under the circumstance that a certain condition is added may be selected. For example, the basis may be calculated by adding the condition that the luminance in a specified range is not lower than a certain value and the like. The same as the content discussed above, the performance is highest when the basis is changed into the standard orthogonal basis, but it is calculated on the basis of a limit item that the luminance may not be a negative value, so that it is difficult to achieve orthogonality or standard orthogonality.

(3) Redundant Basis

A number of bases for measurement is not always equal to a number N of the lighting, and may also be a value larger than N. When it is larger than N, the SN ratio may be increased, and the advantage of more accurate estimation may be achieved. Under such a condition, an inverse matrix of X does not exist, so that, alternately, estimation is implemented as shown in formula (20):

$$\hat{A} = UX^+ \quad (20),$$

where $X^+$ is the Moore-Penrose pseudoinverse of X. Similarly, for maximizing the estimation performance under such a condition, squares of the distinguished values of X are changed into the same value respectively. Therefore, a Pseudo Orthogonal Bases (POB) optimization technology is disclosed. For example, Masashi Sugiyama and Hidemitsu Ogawa, "Pseudo Orthogonal Bases Give the Optimal Generalization Capability in Neural Network Learning" http://www.ms.k.u-tokyo.ac.jp/1999/SPIE99.pdf, 1999) may be referred to.

The same as the content discussed above, the basis may also be calculated by adding another condition.

An example of the linear lighting model is described above with reference to (a) of FIG. 12, and an example of the nonlinear lighting model is described below with reference to (b) of FIG. 12. Under the nonlinear lighting model, the estimation images of the workpiece 4 during lighting with the variable lighting parameters may be generated by virtue of a nonlinear estimation function about the lighting parameters on the basis of the image data sets.

A condition of only one light source is shown in (b) of FIG. 12. A light source L4 may light the workpiece 4 at different luminous positions. However, the number of the light source may be required to be more than 2 according to the requirement, and for example, descriptions will be made for the condition of N light sources.

A nonlinear model is utilized where the foregoing linear model is not applicable. A pure example is listed. When N pieces of lighting with adjustable incident angles and luminance are utilized, if the amount of the light is $w_i$ ($1 \le i \le N$) and the incident angle is ($\theta_i$, $\varphi_i$), the parameter vector may be expressed as formula (21):

$$\theta_L = (w_1, \theta_1, \varphi_1, w_2, \theta_2, \varphi_2, \ldots, w_N, \theta_N, \varphi_N)^T \quad (21).$$

At this moment, the far field mode is shown in formula (22), and has no linearity with respect to the parameter vector:

$$\psi(\theta, \varphi) = \Sigma_{i=1}^N w_i \psi_i(\theta - \theta_i, \varphi - \varphi_i) \quad (22).$$

Under such a condition, it is difficult to define a general mathematical model, but any image generation model such as a recently disclosed deep-learning-based image generation method, i.e., a Generative Adversarial Network (GAN) and an Auto Encoder (AE) systems, may be utilized.

A specific example of a simplified model utilized under a specific limited condition is shown below. In case of implementation according to a Lambert mode under the condition that only diffusely scattered light is modeled, any piece of lighting may be expressed in a linear combination manner by virtue of three basis functions. The mode is approximately linear, but a process of calculating a mixed coefficient of a basis according to the parameterized lighting condition is nonlinear, so that it belongs to a nonlinear lighting simulator. Specifically, the mode may be defined as formula (23) to formula (26):

$$u = g(BCd(\theta_L)), \quad (23)$$

$$[d(\theta_L)]_q = \sum_{i=1}^N w_i \exp\left(-\frac{\left|\max\left(r^T(\theta_i, \varphi_i)r(\theta_S^{(q)}, \varphi_S^{(q)}), 0\right)\right|^2}{\sigma^2}\right), \quad (24)$$

$$r(\theta, \varphi) = [\cos\varphi\cos\theta, \sin\varphi\cos\theta, \sin\theta]^T, \text{ and} \quad (25)$$

$$C = [l_1, l_2, \cdots, l_Q], \quad (26)$$

where B is a P×3 matrix (P is the pixel number of the image), C is a 3×Q matrix, $d(\theta_L)$ is a nonlinear Q-dimensional column vector about the lighting parameter, $\{(\theta_S^{(q)}, \varphi_S^{(q)})\}_{q=1}^Q$ is a sampling point column on any sphere, and is distributed at an equal interval as much as possible on the sphere such as HEALPix, the number of sampling points Q is set to cover a solid angle range of the lighting parameters with a complete resolution, and $I_q$ is a light source direction vector when the workpiece is lighted from a spherical coordinate ($\theta_S^{(q)}$, $\varphi_S^{(q)}$). A mathematical meaning of the formula is that the lighting parameters are mapped to a Q-dimensional high-dimensional space through nonlinear mapping d and luminance values of pixels are calculated according to the space through linear mapping, and is directly changed into the following meaning.

At first, according to the input lighting parameters, there is made such a hypothesis that each piece of lighting has a Gaussian distribution angular range with a standard deviation σ and the incident angle is discretized and expressed as a value on each point sampled on the sphere. Second, a mixed coefficient (the lighting direction vector) of the three basis functions of the Lambert model in each sampling point (corresponding incident angle) is calculated through the matrix C, and a basis function expressed by the matrix B is mixed. Finally, the linear function g is applied.

The matrix B is a matrix dependent on the workpiece, so that the matrix B is estimated by changing captured image sets measured by the lighting parameters for at least three times. The matrix C may be calculated as calibration.

If being implemented in the form of a software functional unit and sold or used as an independent product, the device and system for setting the lighting condition when the object is checked or part of it may be stored in a computer-readable storage medium. Based on this understanding, the technical solutions of the present disclosure essentially, or the part contributing to the prior art, or all or part of the technical solutions may be implemented in the form of a software product, and the computer software product is stored in a storage medium, including several instructions for causing a piece of computer equipment (which may be a personal computer, a server or network equipment) to execute all or part of the steps of the method according to each example of the present disclosure. The foregoing storage medium includes various media capable of storing program codes such as a USB disk, a Read-Only Memory (ROM), a Random Access Memory (RAM), a removable hard disk, a magnetic disk, or an optical disk, and moreover, may further include a data stream downloaded from a server or a cloud.

The foregoing is only the preferred implementation modes of the present disclosure, and it should be noted that those of ordinary skilled in the art may make some improvements and modifications without departing from the principle of the present disclosure. These improvements and modifications should be regarded to be within the scope of protection of the present disclosure.

The invention claimed is:

1. A method for setting a lighting condition when an object is checked, wherein, a check module implemented by a processor comprises a machine learning model is used to check the object, the machine learning model being generated by using learning data comprising images, the method is characterized by comprising:

lighting the object by light sources capable of changing lighting parameters specifying the lighting condition when the object is captured, and capturing the object by an image sensor in a plurality of lighting parameters, so as to obtain captured images corresponding to the plurality of lighting parameters, wherein, the object has known label data;

generating estimation images of the object when the object is lighted in variable lighting parameters, on the basis of image data sets obtained by associating the captured images and the lighting parameters corresponding to the captured images; and applying the estimation images corresponding to the variable lighting parameters and the corresponding label data of the object to the learning of a machine learning model, and setting both the lighting condition and check algorithm parameters of the machine learning model by simultaneously optimizing both the lighting parameters and the check algorithm parameters, on the basis of comparison result between estimation result of the machine learning model and the label data of the object.

2. The method of claim 1, wherein, generating estimation images of the object when the object is lighted in variable lighting parameters comprises:

preparing a plurality of image data sets corresponding to a plurality kinds of objects; and on the basis of the plurality of image data sets, generating a plurality of estimation images respectively corresponding to the plurality kinds of objects when the plurality kinds of objects are lighted in the variable lighting parameters.

3. A method for setting a lighting condition when an object is checked, wherein, a check module implemented by a processor comprises a machine learning model is used to check the object, the machine learning model being generated by using learning data comprising images, the method is characterized by comprising:

lighting the object by light sources capable of changing lighting parameters specifying the lighting condition when the object is captured, and capturing the object by an image sensor in a plurality of lighting parameters, so as to obtain a plurality of captured images corresponding to the plurality of lighting parameters, wherein, the object has corresponding label data;

generating estimation images of the object when the object is lighted in variable lighting parameters, on the basis of image data sets obtained by associating the captured images and the lighting parameters corresponding to the captured images; and applying the estimation images corresponding to the variable lighting parameters to the machine learning model which has already performed learning, and setting the lighting condition according to optimization result with respect only to the lighting parameters on the basis of comparison result between estimation result of the machine learning model and the label data of the object.

4. The method of claim 3, wherein, applying the estimation images corresponding to the variable lighting parameters to the machine learning model which has performed learning comprises:

applying learning data comprising the estimation images and the corresponding label data of the object to the additional learning of the machine learning model, so as to update a part of or all of the check algorithm parameters of the machine learning model, wherein, the label data represents checked features of the object; and optimizing both the lighting parameters and a part of or all of the check algorithm parameters of the machine learning model so as to make the estimation result of the machine learning model be consistent with the label data.

5. The method of claim 3, wherein, when the lighting condition is set, the number of the estimation images which are applied to the machine learning model in order to determine the lighting parameters is less than the number of captured images which are applied to the learning of the machine learning model.

6. The method of claim 3, wherein, the lighting parameters comprises luminous positions and luminous intensity of the light sources.

7. The method of claim 3, wherein, setting the lighting condition when the check module is used to check the object comprises:

selecting the lighting parameters that minimize the loss function representing the comparison result, wherein, selecting the lighting parameters comprises: selecting the lighting parameters that minimize the loss average of the loss function for the lighting parameters of a predetermined range.

8. The method of claim 3, wherein, generating estimation images of the object when the object is lighted in variable lighting parameters comprises:

generating the estimation images of the object when the object is lighted in the variable lighting parameters on the basis of weighted linear superposition sum of the captured images corresponding to the lighting parameters that are included in the image data sets, wherein, whose weights are determined according to both the variable lighting parameters and the lighting parameters of the captured images.

9. The method of claim 3, wherein, generating estimation images of the object when the object is lighted in variable lighting parameters comprises:
generating the estimation images of the object when the object is lighted in the variable lighting parameters on the basis of the image data set and using a nonlinear estimation function with respect to the variable lighting parameters.

10. A device for setting a lighting condition when an object is checked, wherein, the device is characterized by comprising:
a processor, configured to implement an acquisition unit, a generation unit and a setting unit, wherein
a check module implemented by the processor comprises a machine learning model is used to check the object, the machine learning model being generated by using learning data comprising images,
the acquisition unit is configured for acquiring captured images regarding the object, wherein, the object being lighted by light sources capable of changing lighting parameters specifying the lighting condition when the object is captured, and the object being captured by an image sensor in a plurality of lighting parameters, so as to obtain the captured images corresponding to the plurality of lighting parameters, wherein, the object has known label data;
the generation unit is configured for generating estimation images of the object when the object is lighted in variable lighting parameters, on the basis of image data sets obtained by associating the captured images and the lighting parameters corresponding to the captured images; and
the setting unit is configured for applying the estimation images corresponding to the variable lighting parameters and the corresponding label data of the object to the learning of the machine learning model, and setting both the lighting condition and the check algorithm parameters of the machine learning model by simultaneously optimizing both the lighting parameters and the check algorithm parameters, on the basis of comparison result between estimation result of the machine learning model and the label data of the object.

11. The device of claim 10, wherein, the generation unit is configured for:
preparing a plurality of image data sets corresponding to a plurality kinds of objects; and
on the basis of the plurality of image data sets, generating a plurality of estimation images respectively corresponding to the plurality kinds of objects when the plurality kinds of objects are lighted in the variable lighting parameters.

12. A device for setting a lighting condition when an object is checked, the device is characterized by comprising:
a processor, configured to implement an acquisition unit, a generation unit and a setting unit, wherein
a check module implemented by the processor comprises a machine learning model is used to check the object, the machine learning model being generated by using learning data comprising images,
the acquisition unit is configured for acquiring captured images regarding the object, wherein, the object being lighted by light sources capable of changing lighting parameters specifying the lighting condition when the object is captured, and the object being captured by an image sensor in a plurality of lighting parameters, so as to obtain the captured images corresponding to the plurality of lighting parameters, wherein, the object has corresponding label data;
the generation unit is configured for generating estimation images of the object when the object is lighted in variable lighting parameters, on the basis of image data sets obtained by associating the captured images and the lighting parameters corresponding to the captured images; and
the setting unit is configured for applying the estimation images corresponding to the variable lighting parameters to the machine learning model which has already performed learning, and setting the lighting condition according to optimization result with respect only to the lighting parameters on the basis of comparison result between estimation result of the machine learning model and the label data of the object.

13. The device of claim 12, wherein, the setting unit is configured for:
applying learning data comprising the estimation images and the corresponding label data of the object to the additional learning of the machine learning model, so as to update a part of or all of the check algorithm parameters of the machine learning model, wherein, the label data represents checked features of the object; and
optimizing both the lighting parameters and a part of or all of the check algorithm parameters of the machine learning model so as to make the estimation result of the machine learning model be consistent with the label data.

14. The device of claim 12, wherein,
the lighting parameters comprises luminous positions and luminous intensity of the light sources.

15. The device of claim 2, wherein, the setting unit is configured for:
selecting the lighting parameters that minimize the loss function representing the comparison result, wherein, selecting the lighting parameters comprises: selecting the lighting parameters that minimize the loss average of the loss function for the lighting parameters of a predetermined range.

16. The device of claim 12, wherein, the generation unit is configured for:
generating the estimation images of the object when the object is lighted in the variable lighting parameters on the basis of weighted linear superposition sum of the captured images corresponding to the lighting parameters that are included in the image data sets, wherein, whose weights are determined according to both the variable lighting parameters and the lighting parameters of the captured images.

17. The device of claim 12, wherein, the generation unit is configured for:
generating the estimation images of the object when the object is lighted in the variable lighting parameters on the basis of the image data set and using a nonlinear estimation function with respect to the variable lighting parameters.

18. A system for setting a lighting condition when an object is checked, characterized by comprising: a processor, executing the method of claim 1.

19. A non-transitory computer-program product, characterized in that, the computer-program product comprises instructions which, when executed by at least one processor, causes the processor to execute the method of claim 1.

20. A non-transitory storage medium, characterized in that, a program is stored thereon, the program, when being executed, executing the method of claim 1.

* * * * *